United States Patent [19]

Johnson

[11] 4,225,862

[45] Sep. 30, 1980

[54] TUNING FORK OSCILLATOR DRIVEN LIGHT EMITTING DIODE DISPLAY UNIT

[75] Inventor: Oliver D. Johnson, Austin, Tex.

[73] Assignee: International Business Machines Corporation, Armonk, N.Y.

[21] Appl. No.: 17,863

[22] Filed: Mar. 5, 1979

[51] Int. Cl.³ .................................. G06F 3/14

[52] U.S. Cl. .................................. 340/755; 340/814

[58] Field of Search .................. 340/755, 753, 751, 811, 340/814; 331/156

[56] References Cited

U.S. PATENT DOCUMENTS

| | | | |
|---|---|---|---|
| 3,737,722 | 6/1973 | Scharlack | 340/755 |
| 3,846,784 | 11/1974 | Sinclair | 340/755 |
| 3,958,235 | 5/1976 | Duffy | 340/755 |

OTHER PUBLICATIONS

Sam's Modern Dictionary of Electronics, Pub.: Bobbs-Merrill Co., Inc., p. 31.

*Primary Examiner*—Marshall M. Curtis
*Attorney, Agent, or Firm*—J. B. Kraft

[57] ABSTRACT

A display unit is disclosed which utilizes at least one line of oscillated light sources such as LED's selectively turned on and off to create an alphanumeric display. The display unit comprises a supporting member from which a display unit base is resiliently suspended. A pair of display arms is fixed to said base and extend therefrom and a plurality of light sources are mounted on these display arms in at least one line. One or more counterbalancing arms are also fixed to and extend from the base parallel to the display arms. Means are provided for oscillating the display arms and the light sources and for oscillating the counterbalancing arm in the opposite direction so as to counterbalance the display arms, and pulsing means are provided for each of the plurality of light sources, preferably light emitting diodes, to permit at least one "on" light for each of a plurality of positions through which the oscillator moves the line of light emitting diodes.

30 Claims, 8 Drawing Figures

TUNING FORK OSCILLATOR DRIVEN LIGHT EMITTING DIODE DISPLAY UNIT

DESCRIPTION

1. Background of the Invention

This invention relates to alphanumeric display units which may be used in connection with data processing systems or office systems. More particularly, it relates to display units which are simple, relatively inexpensive and may be used in a printer or typewriter in an office text processing system.

Relatively simple display units wherein a plurality of light sources are vibrated through a plurality of repetitive positions while the light sources are selectively turned on and off have been recognized in the art as an expedient for very simple alphanumeric displays in place of the more costly high detailed arrays wherein a separate light source is provided for each point in the overall display. While this type of moving light source display clearly simplifies and reduces the number and complexity of the light sources needed, this technology is of course more subject to disadvantages of distortion produced by irregularities in the movement of the light sources which may be due to such varied phenomena as imbalances in the vibrating unit or extraneous noise produced by the unit. Some rudimentary display systems utilizing moving light emitting diode groups to produce varying alphanumeric characters are described in U.S. Pat. Nos. 3,846,784 and 3,958,235.

With the ever increasing use of microelectronics in the office equipment field, there is a clear demand for small low-cost interactive display units which may be used for basic text processing. An advanced oscillating on-off light source structure such as that of the present invention should provide such a low-cost interactive display unit.

In general, the cathode ray tube (CRT) is considered to be too large, complex and expensive for simple operations to which the present invention is directed. Some alternative possibilities include the aforementioned full matrix of light sources to provide a display of one or more lines. This would of course be excessively expensive for simple low-cost text processing office equipment normally associated with the advanced typewriter technology.

2. Brief Description of the Present Invention

It is a primary object of the present invention to provide the simple low-cost display utilizing an oscillated group of light sources which are selectively turned on and off during the oscillation.

It is another object of the present invention to provide such a simple low-cost display utilizing an oscillated group of selectively turned on light sources which oscillates in a highly uniform mode.

It is a further object of the present invention to provide a display utilizing an oscillating group of selectively turned on light sources from which transmitted vibrations to associated equipment is minimized.

It is yet a further object of the present invention to provide display utilizing an oscillating group of selectively turned on light sources which operate with minimal power requirements.

The present invention accomplishes the above objects by providing a tuning fork oscillator driven display apparatus which comprises a rigid supporting member such as the frame of a typewriter or printer from which the display unit is resiliently suspended. The display unit comprises a base having at least one display arm affixed thereto and extending therefrom, a plurality of light sources mounted on the display arm in at least one line, at least one counterbalancing arm fixed to and extending from said base parallel to the display arm. In accordance with this aspect of the present invention, the means for oscillating the display arm and the counterbalancing arm is fixed to and extends from said base. These oscillating means oscillate the display arm and counterbalancing arms in opposite, i.e., counterbalancing directions. In addition, pulsing means are provided for each of the light sources to permit at least one on light for each of a plurality of positions through which the oscillator moves the line of light sources. Because the entire display unit including the oscillating means, is self-contained, the unit may be substantially isolated from the machine such as the typewriter, printer or other adjacent equipment or structures in the office environment whereby the transmittal of vibrations from the oscillating display to the machine frame is minimized. In this respect, for best results, the means for resiliently suspending the display unit from the supporting member or frame should be so positioned that the display unit is suspended from the frame at the center of gravity of the display unit.

In accordance with a further aspect of the present invention, the tuning fork oscillator drive is arranged so that the counterbalancing arm which oscillates in the opposite direction from the display arms and light sources mounted thereon has a counterbalancing resultant inertial force during the oscillation which is equal and opposite to the combined resultant inertial forces of the display arms and the mounted light sources. In addition, these two resultant inertial forces act at points respectively equidistance from the base.

With the inertial forces thus in balance during oscillation, a highly uniform vibration is provided for the display unit which results in a clear and readily readable alphanumeric display. In addition, the balance of inertial forces within the self-contained display unit minimizes vibration effects during oscillation, thus making it easier to isolate the transmission of vibrations from the display unit to the associated equipment in the typewriter, printer or office environment.

Another aspect of the present invention provides oscillating means which require a minimum of power. Because power supplies for producing higher power are of increased weight, require increased space and are more costly, one requirement in office systems and related equipment is that the power supply be relatively low power, i.e., in the order of five watts. This presents the problem of how to provide such a display unit which is capable of oscillation stroke lengths to accommodate displays of several lines of text material while meeting these minimum power requirements. To this end, the present invention provides oscillation means which comprise a permanent magnet operatively associated with an electromagnet having a coil core substantially parallel to the axis of oscillation of the arm carrying the light source display. In this manner, the core can be positioned so that at midstroke in the oscillation of the display arm when power requirements are greatest, the permanent magnet carried on the display arm is positioned so that the region of maximum flux density on this permanent magnet traverses the axis of the core to thereby apply the maximum magnetic force.

BRIEF DESCRIPTION OF THE DRAWINGS

Referring now to the drawings, wherein a preferred embodiment of the invention is illustrated, and wherein like reference numerals are used throughout to designate like parts.

DESCRIPTION OF THE PREFERRED EMBODIMENT

Figure 1:
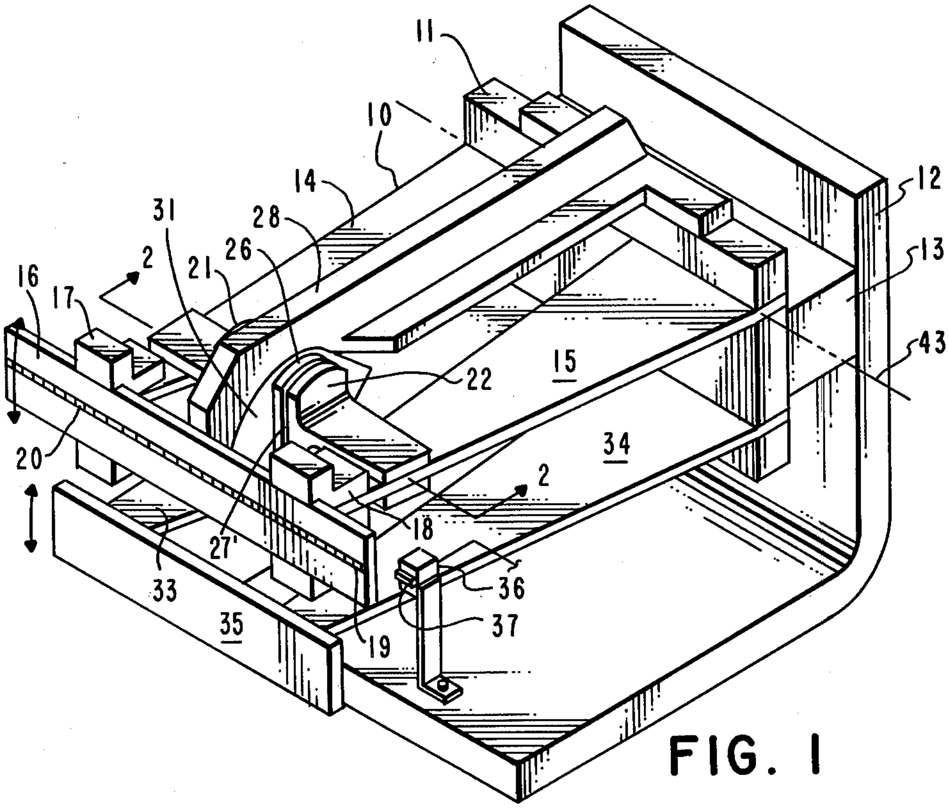
FIG. 1 is a fragmentary diagrammatic view showing a preferred embodiment of the display apparatus of the present invention.
Figure 2:
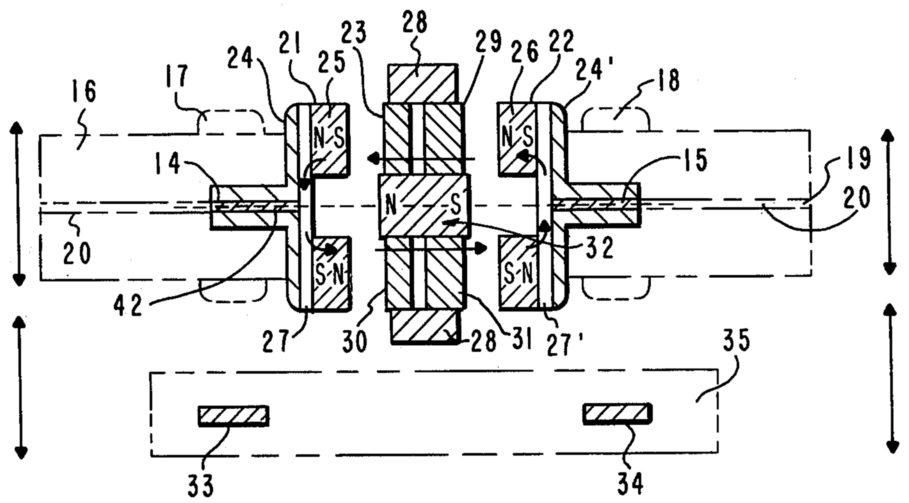
FIG. 2 is a cross-sectional view taken along lines 2—2 of FIG. 1.
Figure 3:
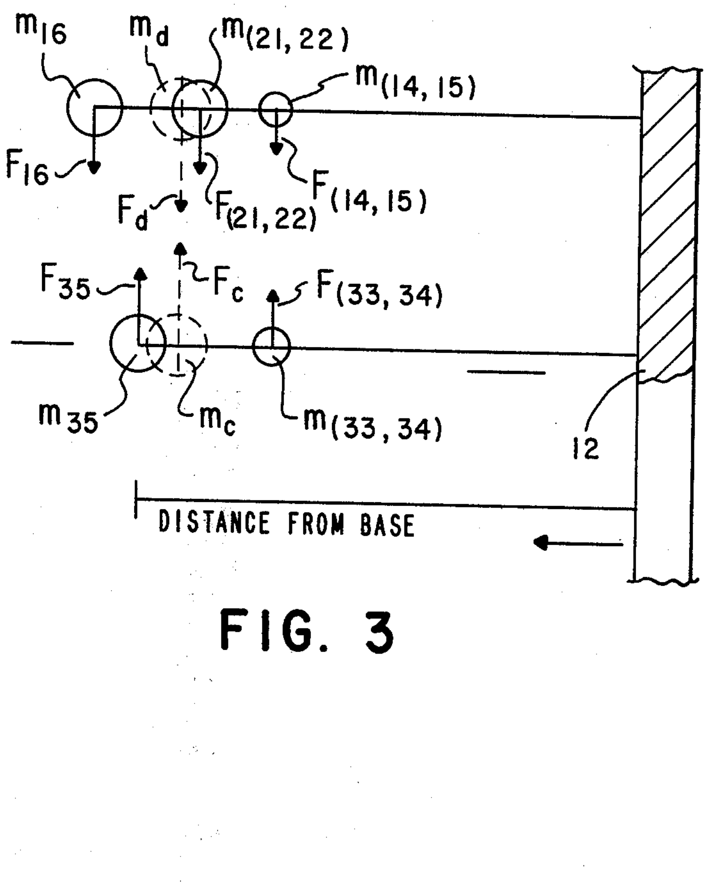
FIG. 3 is a diagram of the forces to graphically illustrate the directions and magnitudes of the balanced inertial forces during an oscillation cycle.

In setting forth a detailed description of the specific embodiment of the present invention, the overall display apparatus will be shown and described mechanically with respect to FIGS. 1 to 3. Then, the logic circuitry for driving the oscillating means and consequently the display will be described with respect to FIGS. 4 and 5 after which circuitry for selectively turning the individual light sources, e.g., light emitting diodes (LED) will be described with respect to FIGS. 6 and 7.

Apparatus Structure

With reference to FIGS. 1 and 2, the display unit 10 has a base 11 which is attached to a machine frame 12 through resilient suspending means 13 which may conveniently be made of a material such as rubber or other elastomeric materials. A pair of display arms 14 and 15 which are leaf springs are affixed to and extend from base 11. Display board 16 is mounted at the end of cantilevered display arms 14 and 15, being gripped in place on said display arms through display board holders 17 and 18 which may be made of any suitable material such as molded plastic and respectively attached to the ends of leaf spring display arms 14 and 15. Display board 16 has mounted thereon a line 19 of a plurality of discrete LED's 20. For purposes of illustration, line 19 contains 192 conventional light emitting diodes 20. Display arms 14 and 15 also support a pair of permanent magnet assemblies 21 and 22 which form a portion of the oscillating means 23. Permanent magnet assemblies 21 and 22 are respectively mounted on leaf spring arms 14 and 15. Each permanent magnet assembly respectively comprises a magnet holder 24 and 24' which respectively fix the permanent magnet 25 and 26 to arms 14 and 15. Each assembly has a soft iron flux path 27 and 27' adjacent to permanent magnets 25 and 26.

Lateral support 28 which rigidly extends from base 11 supports the electromagnet assembly 29 of oscillating means 23. The electromagnet assembly comprises sense coil 30, drive coil 31 and coil core 32 is rigidly suspended by support 28 spaced from permanent magnets 25 and 26.

Counterbalancing arms 33 and 34 which are also preferably cantilevered leaf springs are fixed to and extend laterally from base 11. Counterbalancing weight 35 is supported on arms 33 and 34. With the structure shown in FIGS. 1 and 2, the self-contained display unit 10 which is suspended from the machine frame 12 through resilient means 13 may be substantially balanced so as to produce the uniform oscillation of the line of LED's 19 in the direction shown by the arrow. In order to achieve this balanced self-contained unit, the resultant inertial force produced by the combination of counterbalancing arms 33 and 34 together with counterbalancing weight 35 is equal and opposite to the total resultant inertial force provided by the oscillation of display arms 14 and 15 together with permanent magnet assemblies 21 and 22 mounted thereon as well as display board 16 carried on said arms. Also, these two resultant total inertial forces act at points equidistant from the base.

These balanced resultant inertial forces will be better understood with reference to FIG. 3 which graphically shows the various forces and their distances from the base. In FIG. 3:

$m_{16}$ is mass of display board 16

$F_{16}$ is inertial force of 16 during the oscillation $m_{(21,22)}$ is mass of magnet assemblies 21 and 22

$F_{(21,22)}$ is inertial force of 21 and 22

$m_{(14,15)}$ is mass of display arms 14 and 15

$F_{(14,15)}$ is inertial force of 14 and 15

$m_{35}$ is mass of counterbalancing weight 35

$F_{35}$ is inertial force of 35 during the oscillation $m_{(33,34)}$ is inertial force of arms 33 and 34

$m_d$ is total mass of the LED display assembly $F_d$ is the total inertial force of the LED display assembly $m_c$ is the total mass of the counterbalancing assembly $F_c$ is the total inertial force of the counter balancing assembly $F_c$ is equal and opposite to $F_d$, and $F_c$ and $F_d$ are equidistant from base 12.

The inertial force F may be calculated for any element as follows:

In an oscillating system $$y=a \sin \omega t$$

where a is amplitude of ½ stroke expressed in inches and the frequency, $$\omega=2\pi N$$

(where N is expressed in cycles/second and y is the displacement in inches)

The acceleration $$\ddot{y}=-a\omega^2 \sin wt$$

where $\ddot{y}$ is the acceleration in the direction of oscillation expressed in in./second² then maximum inertial force, $$F=\ddot{y}_{max}m$$

where m is the mass in lbs. (sec.)$^2$/in.

It should be noted that while the self-contained display unit may be substantially balanced with respect to primary oscillations, there are some minimal secondary oscillations which have substantially no practical effect on the present embodiment. These secondary oscillations are into and out of the plane of displacement, i.e., the plane of the displayed alphanumeric information. The secondary effect occurs because the oscillation of the arms are in arcs about the points that the arms join the base. If necessary, these secondary oscillations may be even further reduced by lengthening the arms and thereby reducing the curvature of said display arcs.

Figure 4:
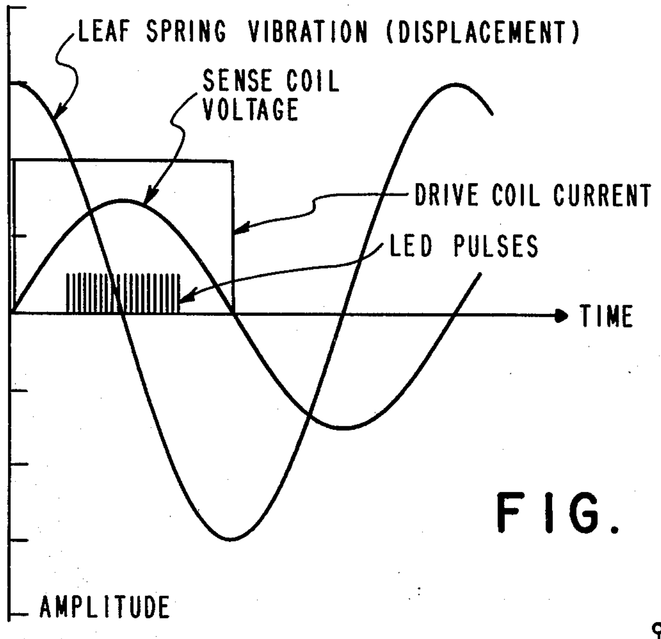
FIG. 4 is a graph showing the cyclic voltage, current and LED displacement versus time in the operation of the present display apparatus.

In order to obtain a clear and consistent alphanumeric display, the line of light emitting diodes 19 must be oscillated vertically at least a frequency of 50 Hertz. In the illustrative embodiment, a 3.84 inch linear line of 192 diodes is oscillated vertically at 50 Hertz with a vertical stroke of 0.8 inch to produce 38 rows on 0.020 inch centers during the down stroke, 68° above and below midstroke. The oscillation cycle is shown in FIG. 4.

Figure 5:
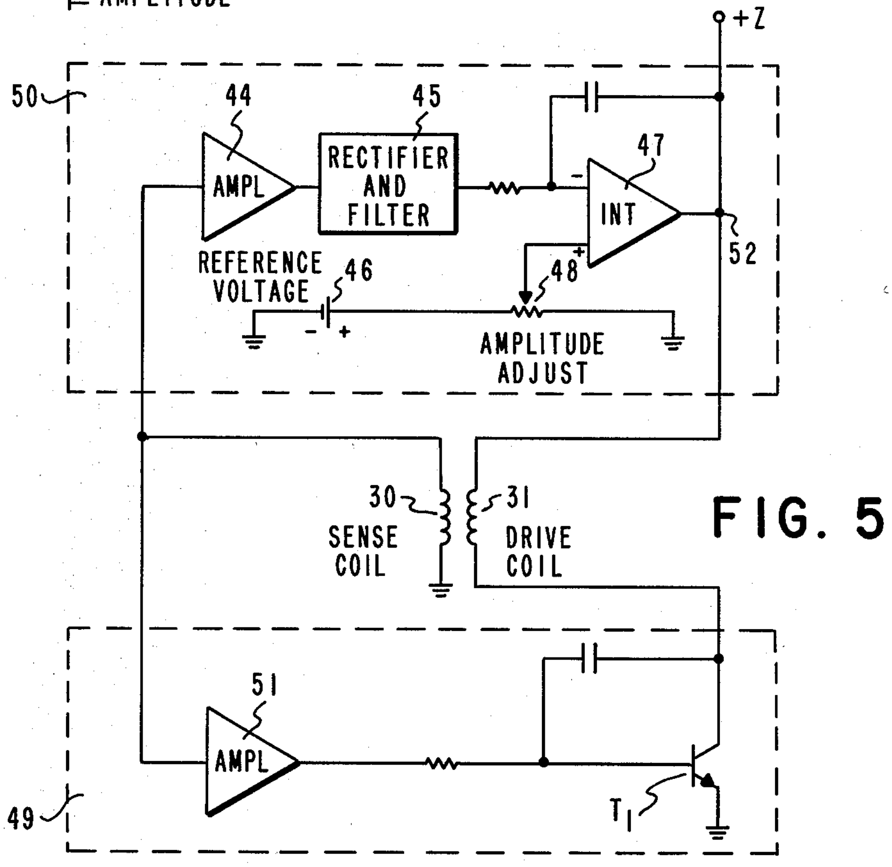
FIG. 5 is a diagram of the circuitry for the oscillator drive means.

To coordinate the display cycle with the oscillation means shown in FIG. 5, emitter means 36 (FIG. 1) are provided which comprises an emitter pulse sensor 37 which can be any conventional type of vertical position sensor, i.e., one which projects the beam of light onto a photographic timing tape (not shown) mounted adjacent to sensor 37 on the backside of display board 16. In the conventional manner, sensor 37 projects the beam of light through the oscillating timing tape and senses the resulting pulses to obtain time/position information.

As previously stated with the arrangement shown in FIGS. 1 and 2, the display will be created by selectively turning light emitting diodes 20 on and off at particular positions in the oscillation cycle of LED line 19.

Figure 2A:
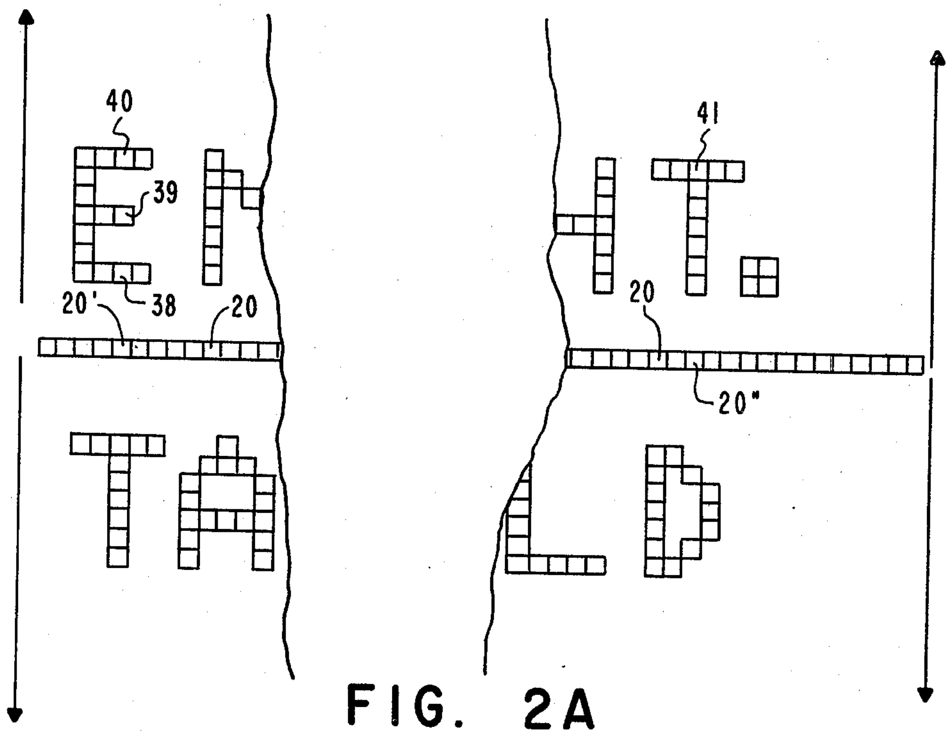
FIG. 2A is a diagrammatic partial front view of the alphanumeric pattern produced by selectively turning light emitting dioes 20 on and off at particular coordinate positions in the oscillation of diode line 19 (shown in the home position) during an oscillation cycle along the path set forth by the arrows.

This will be better understood with reference to FIG. 2A. FIG. 2A is a diagrammatic partial front view of the alphanumeric pattern produced by selectively turning light emitting diodes 20 on and off at particular coordinate positions in the oscillation of diode line 19 (shown in the home position) during an oscillation cycle along the path set forth by the arrows. Thus, when line 19 of LED's is oscillating at a rate greater than 50 Hertz and the light emitting diodes creating the pattern are turned on every time particular diodes reach selected coordinate positions, the alphanumeric pattern shown in FIG. 2A will be maintained. For example, as line 19 is oscillated, LED 20' is turned on every time diode line 19 passes coordinate positions 40, 39 and 38 to thereby form the appropriate segments of the character "E". Similarly, diode 20 is turned on at the seven coordinate positions along line 41 during this oscillation cycle to form the center portion of the character "T".

In order to maintain the maximum oscillation stroke with the minimum power, present apparatus is preferably arranged so that center line 42 through permanent magnets 25 and 26 is substantially coaxial with electromagnet coil core 32 at midstroke in the oscillation; midstroke in the oscillation coincides with the previously mentioned home position of LED line 19. Thus, when LED line 19 is oscillated about pivot axis 43 where display arms 14 and 15 are respectively attached to base 11, the coil core 32 is fixed in a position substantially parallel to axis of oscillation 43. When permanent magnets 25 and 26 which are respectively carried on display arms 14 and 15 pass through the midpoint in the oscillation stroke, the region of maximum flux density will coincide with the axis of the core to thereby provide the maximum magnetic force. Accordingly, maximum magnetic force will be at midstroke where the drive needs are greatest for a resonant oscillator. This will of course minimize the power requirements. Minimization of such requirements will permit the present display apparatus to meet the power needs of conventional office system, i.e., in the order of 5 watts.

Oscillator Drive

Circuitry for oscillating the display apparatus will now be described with reference to FIGS. 1 and 2 taken together with FIGS. 4 and 5. The drive operation in general involves inducing a cyclic voltage in the phase sensing coil 30. This sinusoidal sense coil voltage is shown diagrammatically in the graph in FIG. 4. While this voltage is positive, current flows in the drive coil as shown in the graph. This current in the drive coil produces an electromagnetic energy pulse to drive the tuning fork oscillator. During the next half cycle, the sense coil is negative and no energy pulse is delivered. While the polarities of the magnetic sense and drive coils of the apparatus in FIG. 2 are arranged so as to produce a magnetic drive force on the downward stroke, if desired, the current in the drive coil could be reversed on the next half cycle to produce a magnetic drive force in both directions. In any event, FIG. 4 further shows the vibration of the leaf spring free end, i.e., displacement produced by the half cycle drive coil current shown. FIG. 4 also shows the sensed position pulses which will be used for flashing, i.e., turning the LED's on and off. This will be described in detail hereinafter. For the purposes of the present illustration, the timing pulses for flashing the LED's are shown operative only during the downstroke. With additional electronic circuitry, the LED timing pulses could also be repeated on the upstroke. This would produce increased brightness of the display. However, it would require additional control circuitry.

The logic circuitry for coil driving circuit and amplitude regulating circuit is shown in FIG. 5. With reference to FIGS. 2 and 5, the oscillation energy is supplied through the drive coil 31. This energy is of course consumed by mechanical damping, electrical impedience and magnetic reluctance. In order to maintain a constant amplitude of oscillation, the energy input must be regulated as shown in the circuit of FIG. 5. This regulation is accomplished by regulating the current through the drive coil. During the operation of the oscillating means, the motion of the permanent magnets 25 and 26 (FIG. 2) attached to cantilever spring arms 14 and 15 induce a voltage across the sense coil 30. This voltage signal is amplified through amplifier 44, FIG. 5, and rectified and filtered through rectifier and filter 45. It is then compared to a reference voltage 46 by means of integrator 47 which controls the voltage through drive coil 31. If the voltage signal is higher than the reference, the current through the drive coil is reduced. If the voltage signal is lower, the current is increased. Increasing the current through the drive coil increases the force on permanent magnets 25 and 26, thereby increasing the amplitude of motion and velocity which in turn increases the voltage across the sense coil. Reducing the current has the opposite effect.

In this manner, a current is supplied to the drive coil 31 at a level which drives the display to an amplitude which generates a voltage across the sense coil 30 equal to the reference voltage 46 as applied to the integrator 47 through the amplitude adjust means 48. By varying the reference voltage through increasing or decreasing the positive voltage applied to integrator 47 by means of amplitude adjust 48, the magnitude or amplitude of the oscillating motion can be set to the desired level.

Thus, amplitude regulating circuit 50 controls drive coil current amplitude. Coil driving circuit 49 operates so that the drive coil current is only applied through the drive coil only when the positive voltage is applied to the sense coil. When such a positive voltage is applied, it is amplified through amplifier 51 and applied to the base of transistor T1 to thereby turn this transistor on to thereby permit the regulated positive voltage level at node 52 to be applied across drive coil 31. When the voltage across sense coil 30 swings negative, the voltage level applied to the base of transistor T1 drops below the operative state and transistor T1 is turned off to thereby turn the current through drive coil 31 off.

It should be noted that during the initiation cycle, when power through the oscillator circuit shown in FIG. 5 is turned on, electrical and mechanical noise trigger the integrator 47 to start a driving cycle which then procedes in the manner previously described.

Circuitry for Selectively Flashing the LED's

Several techniques exist for determining when to pulse the LED's in order to produce a particular dot within the alphanumeric matrix produced by the moving row of LED's 20. One method is to detect the point when the sense coil changes from positive to negative. Then, since the mechanical system is oscillating in a steady state, a fixed electronic time delay before firing the LED will produce a data light at the approximate matrix position. Variations in amplitude and frequency of vibration, however, will cause the display image to move up and down or expand or contract to thereby cause some image distortion. An expedient which insures that the image will always be the same size and undistorted and located at the same position is shown in FIG. 1. As previously mentioned, an emitting comb such as a photographic timing tape (not shown) is attached to the backside of display board 16 adjacent sensor 37. Sensor 16 comprises a light emitting diode/-photo resistor pair which projects a beam of light through the oscillating timing tape and senses the resulting pulses to obtain time/position information which is used to fire a pulse each time a vertical matrix position is detected as a window in the oscillating timing tape.

Figure 6:
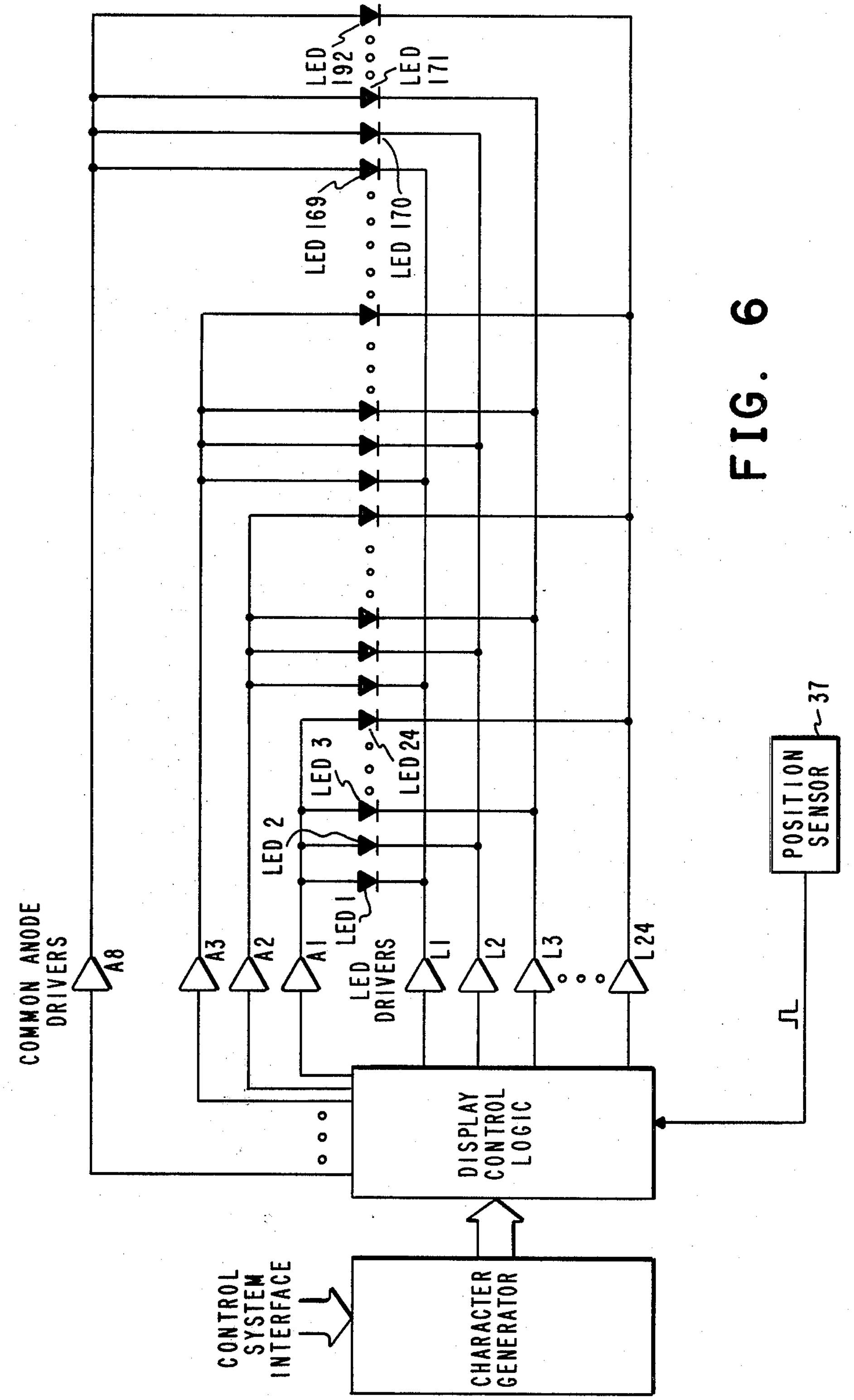
FIG. 6 is a diagram of the circuitry for selectively turning the LED's on during oscillation.
Figure 7:
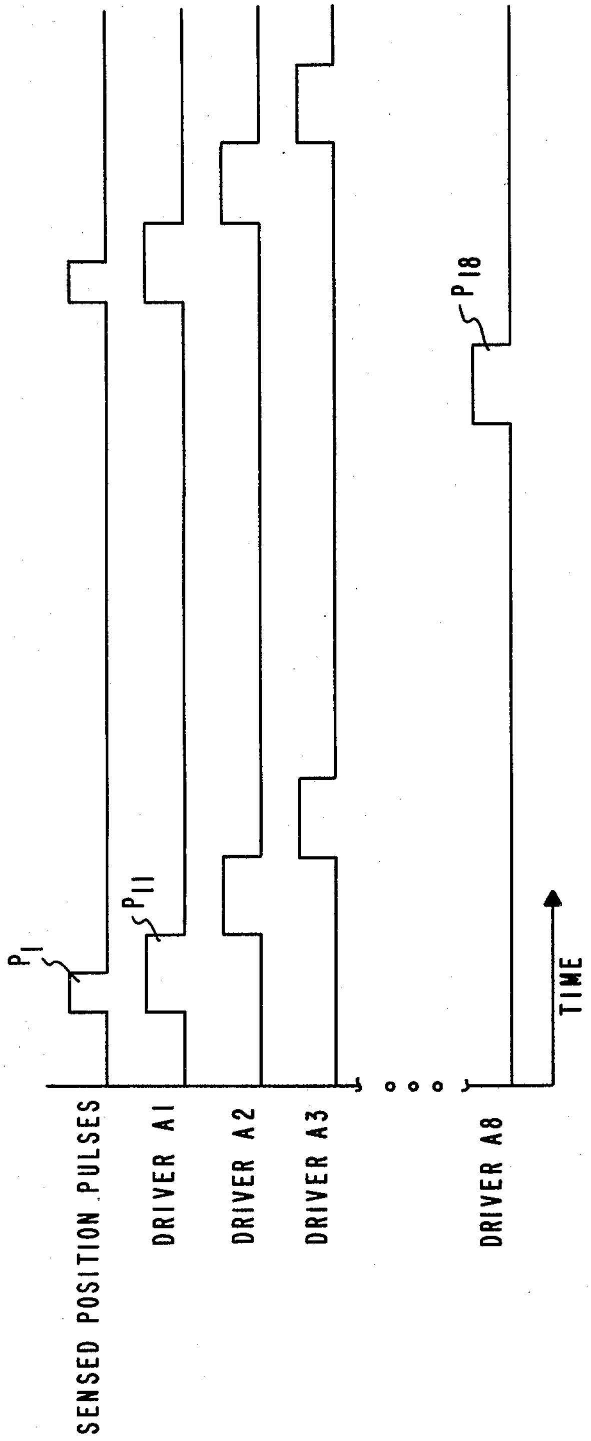
FIG. 7 is a graph showing the timing pulses used to selectively turn the LED's on during a display cycle.

As previously mentioned with respect to FIG. 4, the plurality of sensed position pulses during a single drive coil current pulse will be used to turn on the necessary LED's for that particular displacement point in order to display the desired line of characters. With reference to FIG. 6, let us consider what happens in displaying the characters for a particular line at a particular displacement point. For means and illustration, let us assume that we are dealing with a vibrating row of 192 LED's LED 1 through LED 192 (FIG. 6). The information which is to be displayed is stored in a control system not shown. Characters to be displayed in a particular line in the display are transferred over the system interface. FIG. 6, to the conventional character generator which generates the dot configuration for character shape which must be maintained in the vibrating line of LED's in order to display the desired line of alphanumeric information. This data is then transferred to the display control logic which will in turn coordinate the information by controlling the turning on and off of the requisite combination of LED's 1 through 192 at a particular displacement position as sensed by the position sensor 37 which inputs the sensed position pulses to display control logic unit. Not all 192 LED's in a particular line need be simultaneously enabled in order for the eye to discern the display. In the arrangement shown in FIG. 6, there are eight common anode drivers A1 through A8 controlled by the display control logic. Each of the eight drivers is connected to and enables 24 of the LED's in the line when pulsed. Let us consider what occurs when sensing means 37 detects a displacement position during the course of an oscillation. As shown in FIG. 4, there may be 20 or more of these sensed positions for each oscillation cycle. Let us assume that the sensing means has sensed one of the plurality of pulses shown in FIG. 4; the position sensor conveys this pulse to the display control logic, FIG. 6. For each sensed position pulse such as P1 in FIG. 7, a plurality of cascaded pulses P11 through P18 are respectively applied to activate common anode drivers A1 through A8, respectively which in turn enables the associated groups of 24 each of the LED's, i.e., the application of a pulse anode driver A1 enable LED's 1 through 24 and the final pulse applied to anode driver A8 enables the last group of LED's 169 through 192. Simultaneously with cascaded pulses applied to common anode drivers A1 through A8, FIG. 7, by the display control logic, FIG. 6, the selected ones of the LED driver L1 through L24 necessary to flash the LED's in the group of 24 being activated by the particular anode driver will be turned on by the display logic. For example, let us assume for the particular alphanumeric information being displayed at a particular displacement line represented by pulse P1 in FIG. 7, LED's 1 through 3 and 23 and 24 as well as LED's 170, 171 and 192 are to be displayed among others, then upon pulse P11, FIG. 7, turning driver A1 on, display logic will also turn on LED drivers L1 through L3, L23 and L24; then, when pulse P18 turns driver A8 on, the display control logic will turn on LED drivers L2, L3, and L24. Because the cascading of common anode drivers A1 through A8 is so rapid, e.g., pulses P11 through P18 are turned on over a time period of 130 microseconds in a system that is oscillating at a rate in the order of 50 Hertz or more, the eye cannot discern this cascaded effect and assumes it sees all of the selected LED's in the 192 LED row flashed at the same time. It is of course acceptable to use one LED driver for each of the 192 LED's in which case only one common anode driver would be used and no cascading of the anode drivers would be necessary. However, in the later case, considerably more circuitry would be required, i.e., 193 electrical connections instead of 32 electrical connections as in the present embodiment.

While the present invention has been illustrated using light sources which flash "on" when pulsed, it will be understood that other picture elements which may turn dark when pulsed such as liquid crystal devices may be alternatively used.

While the invention has been particularly shown and described with reference to a particular embodiment, it will be understood by those skilled in the art that various changes in form and detail may be made without departing from the spirit and scope of the invention.

What is claimed is:

1. A tuning fork oscillator driven display apparatus comprising a supporting member, a display unit base, means for resiliently suspending said base from said supporting member, at least one display arm fixed to and extending from said base, a plurality of light sources mounted on said display arm in at least one line, at least one counterbalancing arm fixed to and extending from said base parallel to said display arm, means for oscillating said display arm and said mounted light sources and for oscillating said counterbalancing arm in the opposite direction fixed to and extending from said base, and pulsing means for each of said plurality of light sources to permit at least one on light for each of a plurality of positions through which said oscillator moves said line of light sources.

2. The display apparatus of claim 1 having at least one pair of parallel display arms.

3. The display apparatus of claim 2 wherein said line of light sources forms a surface of oscillation parallel to the axis of oscillation of said display arms.

4. The display apparatus of claim 3 wherein said light sources are positioned in a plurality of parallel lines.

5. The display apparatus of claim 3 wherein pulsing means turn on said oscillating light sources to create a display of alphanumeric characters in a line perpendicular to the direction of oscillation.

6. The display apparatus of claim 4 wherein said pulsing means turn on said oscillating light sources to create a display of alphanumeric characters in a line parallel to the direction of oscillation.

7. The display apparatus of claim 2 wherein said counterbalancing arm extends from said base at a different level than the level at which said display arms extend from said base.

8. The display apparatus of claim 2 wherein said display arms and said counterbalancing arms extend from said base to a single level.

9. The display apparatus of claim 2 wherein said display apparatus base is resiliently suspended from said supporting member substantially at the center of gravity of said display unit.

10. The display apparatus of claim 2 wherein said oscillating means comprise a permanent magnet mounted on a display arm operatively associated with an electromagnet having a coil core substantially parallel to the axis of oscillation of said display arm.

11. A tuning fork oscillator driven display apparatus comprising a base, at least one display arm fixed to and extending from said base, a plurality of light sources mounted on said display arm in at least one line, at least one counterbalancing arm fixed to and extending from said base parallel to said display arm, means for oscillating said display arm and said mounted light sources and for oscillating said counterbalancing arm in the opposite direction, said at least one counterbalancing arm having a resultant inertial force during said oscillation equal and opposite to the combined resultant inertial force of said display arm and said mounted light sources, said resultant inertial forces being equidistant from said base, pulsing means for each of said plurality of light sources to permit at least one on light for each of a plurality of positions through which said oscillator moves said line of light sources.

12. The display apparatus of claim 11 having at least one pair of parallel display arms.

13. The display apparatus of claim 12 wherein said line of light sources forms a surface of oscillation parallel to the axis of oscillation of said display arms.

14. The display apparatus of claim 13 wherein said light sources are positioned in a plurality of parallel lines.

15. The display apparatus of claim 13 wherein pulsing means turn on said oscillating light sources to create a display of alphanumeric characters in a line perpendicular to the direction of oscillation.

16. The display apparatus of claim 14 wherein said pulsing means turn on said oscillating light sources to create a display of alphanumeric characters in a line parallel to the direction of oscillation.

17. The display apparatus of claim 12 wherein said counterbalancing arm extends from said base at a different level than the level at which said display arms extend from said base.

18. The display apparatus of claim 12 wherein said display arms and said counterbalancing arms extend from said base to a single level.

19. The display apparatus of claim 18 wherein said light sources are positioned in a plurality of parallel lines.

20. The display apparatus of claim 19 wherein pulsing means turn on said oscillating light sources to create a display of alphanumeric characters in a line perpendicular to the direction of oscillation.

21. The tuning fork oscillator driven display apparatus of claim 12 further including a supporting member, and means for resiliently suspending said base from said supporting member.

22. The display apparatus of claim 21 wherein said line of light sources forms a surface of oscillation parallel to the axis of oscillation of said display arms.

23. The display apparatus of claim 22 wherein said light sources are positioned in a plurality of parallel lines.

24. The display apparatus of claim 2 wherein said light sources are light emitting diodes.

25. The display apparatus of claim 12 wherein said light sources are light emitting diodes.

26. The display apparatus of claim 21 wherein said light sources are light emitting diodes.

27. The display apparatus of claim 2 further including another plurality of light sources mounted on said counterbalancing arm in at least one line, and pulsing means for each of said other plurality of light sources to permit at least one on light for each of a plurality of positions through which said oscillator moves said lines of other light sources on said counterbalancing arm.

28. The display apparatus of claim 12 further including another plurality of light sources mounted on said counterbalancing arm in at least one line, and pulsing means for each of said other plurality of light sources to permit at least one on light for each of a plurality of positions through which said oscillator moves said lines of other light sources on said counterbalancing arm.

29. The apparatus of claim 1 wherein said line of light sources is oscillated in a direction substantially perpendicular to said line, and said pulsing means comprise:

means for determining each of said plurality of positions through which said line of light sources is moved, and means responsive to the determination of one of said positions for turning on at least one light in a first group in said line of light sources and then for turning on at least one light in at least one subsequent group in said line prior to the determination of the next position.

30. A tuning fork oscillator driven display apparatus comprising a supporting member, a display unit base, means for resiliently suspending said base from said supporting member, at least one display arm fixed to and extending from said base, a plurality of picture element sources mounted on said display arm in at least one line, at least one counterbalancing arm fixed to and extending from said base parallel to said display arm, means for oscillating said display arm and said mounted light sources and for oscillating said counterbalancing arm in the opposite direction fixed to and extending from said base, and pulsing means for each of said plurality of picture element sources to permit at least one turned-on picture element source for each of a plurality of positions through which said oscillator moves said line of picture element sources.

* * * * *